(12) United States Patent
Bitterfeld et al.

(10) Patent No.: US 11,240,241 B2
(45) Date of Patent: Feb. 1, 2022

(54) DISCOVERY AND MAPPING OF A CLOUD-BASED AUTHENTICATION, AUTHORIZATION, AND USER MANAGEMENT SERVICE

(71) Applicant: ServiceNow, Inc., Santa Clara, CA (US)

(72) Inventors: Robert Bitterfeld, Petach Tikva (IL); Asaf Garty, Sdei Hemed (IL); Bary Solomon, Petah Tikva (IL); Daniel Badyan, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 235 days.

(21) Appl. No.: 16/445,984

(22) Filed: Jun. 19, 2019

(65) Prior Publication Data
US 2020/0403994 A1 Dec. 24, 2020

(51) Int. Cl.
*H04L 12/24* (2006.01)
*H04L 29/06* (2006.01)

(52) U.S. Cl.
CPC ........ *H04L 63/0884* (2013.01); *H04L 63/083* (2013.01); *H04L 63/102* (2013.01); *H04L 63/0272* (2013.01); *H04L 63/0281* (2013.01)

(58) Field of Classification Search
CPC . H04L 63/0884; H04L 63/083; H04L 63/102; H04L 63/0272; H04L 63/0281; H04L 41/12; H04L 67/28; H04L 67/10; H04L 41/0853; H04L 63/0807; H04L 67/20; H04L 67/16; H04L 67/025; G06F 21/57; G06F 21/45; G06F 21/44; G06F 21/305; G06F 9/5072
(Continued)

(56) References Cited

U.S. PATENT DOCUMENTS

| 5,978,594 A | 11/1999 | Bonnell |
| 6,321,229 B1 | 11/2001 | Goldman |

(Continued)

OTHER PUBLICATIONS

International Search Report and Written Opinion for PCT Application No. PCT/US2020/0038140 dated Oct. 12, 2020; 12 pgs.

*Primary Examiner* — Moustafa M Meky
*Assistant Examiner* — Elizabeth Kassa
(74) *Attorney, Agent, or Firm* — Fletcher Yoder PC

(57) ABSTRACT

A computing system includes persistent storage and a discovery application configured to perform operations including obtaining, from a remote computing system, first attributes of a first computing resource, which indicate a first unique resource identifier associated with an authentication system provided by the remote computing system and utilized by the first computing resource. The operations also include obtaining, from the remote computing system, second attributes of the authentication system, which indicate a second unique resource identifier used by the authentication system. The operations additionally include determining that the first unique resource identifier matches the second unique resource identifier and, based on this determination, generating a mapping between the first computing resource and the authentication system to indicate that access to the first computing resource is controlled by the authentication system. The operations further include storing, in the persistent storage, the mapping as one or more configuration items.

20 Claims, 12 Drawing Sheets

(58) Field of Classification Search
USPC .............................................................. 776/5
See application file for complete search history.

(56) References Cited

U.S. PATENT DOCUMENTS

| | | | |
|---|---|---|---|
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,392,300 B2 | 6/2008 | Anantharangachar | |
| 7,617,073 B2 | 11/2009 | Trinon | |
| 7,685,167 B2 | 3/2010 | Mueller | |
| 7,716,353 B2 | 5/2010 | Golovinksy | |
| 7,769,718 B2 | 8/2010 | Murley | |
| 7,865,931 B1* | 1/2011 | Stone | H04L 63/0263 726/1 |
| 7,877,783 B1 | 1/2011 | Cline | |
| 7,925,981 B2 | 4/2011 | Pourheidari | |
| 7,933,927 B2 | 4/2011 | Dee | |
| 7,941,506 B2 | 5/2011 | Bonal | |
| 7,945,860 B2 | 5/2011 | Vambenepe | |
| 8,082,222 B2 | 12/2011 | Rangarajan | |
| 8,346,752 B2 | 1/2013 | Sirota | |
| 8,380,645 B2 | 2/2013 | Kowalski | |
| 8,402,127 B2 | 3/2013 | Solin | |
| 8,554,750 B2 | 10/2013 | Rangaranjan | |
| 8,612,408 B2 | 12/2013 | Trinon | |
| 8,646,093 B2 | 2/2014 | Myers | |
| 8,683,032 B2 | 3/2014 | Spinelli | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,907,988 B2 | 12/2014 | Poston | |
| 9,015,188 B2 | 4/2015 | Behne | |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,261,372 B2 | 2/2016 | Cline | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,534,903 B2 | 1/2017 | Cline | |
| 9,535,737 B2 | 1/2017 | Joy | |
| 9,613,070 B2 | 4/2017 | Kumar | |
| 9,631,934 B2 | 4/2017 | Cline | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 9,967,162 B2 | 5/2018 | Spinelli | |
| 10,002,203 B2 | 6/2018 | George | |
| 10,972,444 B1* | 4/2021 | Schiesser | G06F 16/9535 |
| 2008/0071726 A1 | 3/2008 | Nair et al. | |
| 2014/0359129 A1 | 12/2014 | Sharma et al. | |
| 2016/0306964 A1* | 10/2016 | Austin | G06F 21/52 |
| 2017/0318023 A1* | 11/2017 | Seed | H04L 63/166 |
| 2018/0123940 A1 | 5/2018 | Rimar et al. | |
| 2018/0167397 A1* | 6/2018 | Zhang | H04L 63/102 |
| 2019/0334910 A1* | 10/2019 | Parthasarathy | G06F 3/0482 |

* cited by examiner

DISCOVERY AND MAPPING OF A CLOUD-BASED AUTHENTICATION, AUTHORIZATION, AND USER MANAGEMENT SERVICE

BACKGROUND

Computing devices, software applications, storage structures, and other computing resources that make up a computer network may be discovered and the relationships therebetween may be mapped. These elements of the computer network, as well as the relationships therebetween, may be stored as configuration items in a database. The stored configuration items may later be retrieved and used to generate a visualization of a state or arrangement of these elements within the computer network. Discovering computing resources involves developing software processes that are capable of gathering the information needed for detection, classification, and/or identification of these computing resources.

SUMMARY

A remote computing system, such as a cloud-based computing platform, may provide an authentication system that facilitates user management, authentication, authorization, and other aspects of resource access control. The authentication system may be used by computing resources (e.g., software applications) disposed within the remote computing system, as well as computing resources hosted outside of the remote computing system. The remote computing system may provide an application programming interface (API) by way of which a discovery application can obtain various attributes of the authentication system. The discovery application may obtain, process, and incorporate such attributes into a map that represents the authentication system in the context of other computing resources of the remote computing system. The attributes may indicate, for example, different user pools or directories maintained by the authentication system.

Notably, however, these attributes alone might not be indicative of the relationships between the authentication system and other computing resources, both inside and outside of remote computing system. That is, the attributes might not indicate which computing resources utilize the authentication system for access control. In order to determine and map such relationships, the discovery application may be configured to determine a unique resource identifier of the authentication system and search the attributes of other computing resources for this unique resource identifier. Identifying the unique resource identifier within the attributes of the other computing resources may signal usage of the authentication system by the other computing resources.

The unique resource identifier may take on a different format depending on the particular remote computing system in which the authentication system is disposed. Accordingly, discovery application may be configured to parse the attributes of computing resources for unique resource identifiers having one or more different possible formats. When a new unique resource identifier is found in the context of a computing resource, it may be compared to the unique resource identifier associated with the authentication system. When the two unique resource identifiers match, the discovery application may generate a mapping between the authentication system and the corresponding computing resource, thereby indicating that the computing resource uses the authentication system.

In this way, multiple computing resources that utilize the authentication system may be mapped thereto, thus allowing for the utilization and interconnections of the authentication system to be visually rendered by the discovery application. In some implementations, this visual rendering may be interactive in that it may allow users to modify aspects of the remote computing system by interacting with the visual rendering.

The unique resource identifier of the authentication system may be determined or obtained by obtaining one or more attributes of the authentication system from the remote computing system by way of the API. In some implementations, the unique resource identifier may be explicitly set forth, stated, or otherwise contained in the attributes of the authentication system. In other implementations, the discovery application may be configured to combine one or more of the attributes to determine or generate the unique resource identifier. For example, the attributes may define a service name of the authentication system, a geographic region in which the authentication system resides, an account associated with the authentication system, and/or an alphanumeric identifier associated with the authentication system, among other possible attributes. The unique resource identifier may be determined by combining (e.g., concatenating) one or more of these attributes according to a particular format or formula. Further, in some implementations, the unique resource identifier may be determined based on additional attributes obtained by the discovery application. These additional attributes may be attributes of the remote computing system or attributes of a service identifier (e.g., user account) used by the discovery application to communicate with the API, among other possibilities.

In some cases, the unique resource identifier of the authentication system may be identified as part of discovery of a computing resource before the authentication system itself is discovered. The discovery application may be configured to, based on the content of the unique resource identifier, determine that the unique resource identifier corresponds to the authentication system. Based on the unique resource identifier corresponding to the authentication system, the discovery application may select and execute a corresponding discovery pattern configured to obtain the attributes of the authentication system. The discovery application may be configured to perform similar operations for other types of computing resources associated with corresponding discovery patterns.

Such an approach may be useful when discovery is first initiated and the different components within the remote computing system might not be known. Namely, discovery of one unique resource identifier within the attributes of a computing resource may allow discovery and mapping to automatically proceed through any interconnected computing resources without the need for manual identification of some or all specific computing resources.

Accordingly, a first example embodiment may involve obtaining, by a discovery application and from a remote computing system, first attributes of a first computing resource of a plurality of computing resources provided by the remote computing system on behalf of a managed network. The first attributes indicate a first unique resource identifier associated with an authentication system provided by the remote computing system and utilized by the first computing resource. The first example embodiment may also involve obtaining, by the discovery application and from the remote computing system, second attributes of the authentication system. The second attributes indicate a second unique resource identifier used by the authentication system. The first example embodiment may additionally involve determining, by the discovery application, that the first unique resource identifier matches the second unique resource identifier. The first example embodiment may further involve, based on the first unique resource identifier matching the second unique resource identifier, generating, by the discovery application, a mapping between the first computing resource and the authentication system to indicate that access to the first computing resource is controlled by the authentication system. The first example embodiment may yet further involve storing, in persistent storage configured to store data on behalf of the managed network, the mapping as one or more configuration items.

In a second example embodiment, a computing system may include persistent storage configured to store data on behalf of a managed network and a discovery application configured to perform operations. A remote computing system may provide a plurality of computing resources on behalf of the managed network. The operations may include obtaining, from the remote computing system, first attributes of a first computing resource of the plurality of computing resources. The first attributes indicate a first unique resource identifier associated with an authentication system provided by the remote computing system and utilized by the first computing resource. The operations may also include obtaining, from the remote computing system, second attributes of the authentication system. The second attributes may indicate a second unique resource identifier used by the authentication system. The operations may additionally include determining that the first unique resource identifier matches the second unique resource identifier. The operations may further include, based on the first unique resource identifier matching the second unique resource identifier, generating a mapping between the first computing resource and the authentication system to indicate that access to the first computing resource is controlled by the authentication system. The operations may yet further include storing, in the persistent storage, the mapping as one or more configuration items.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
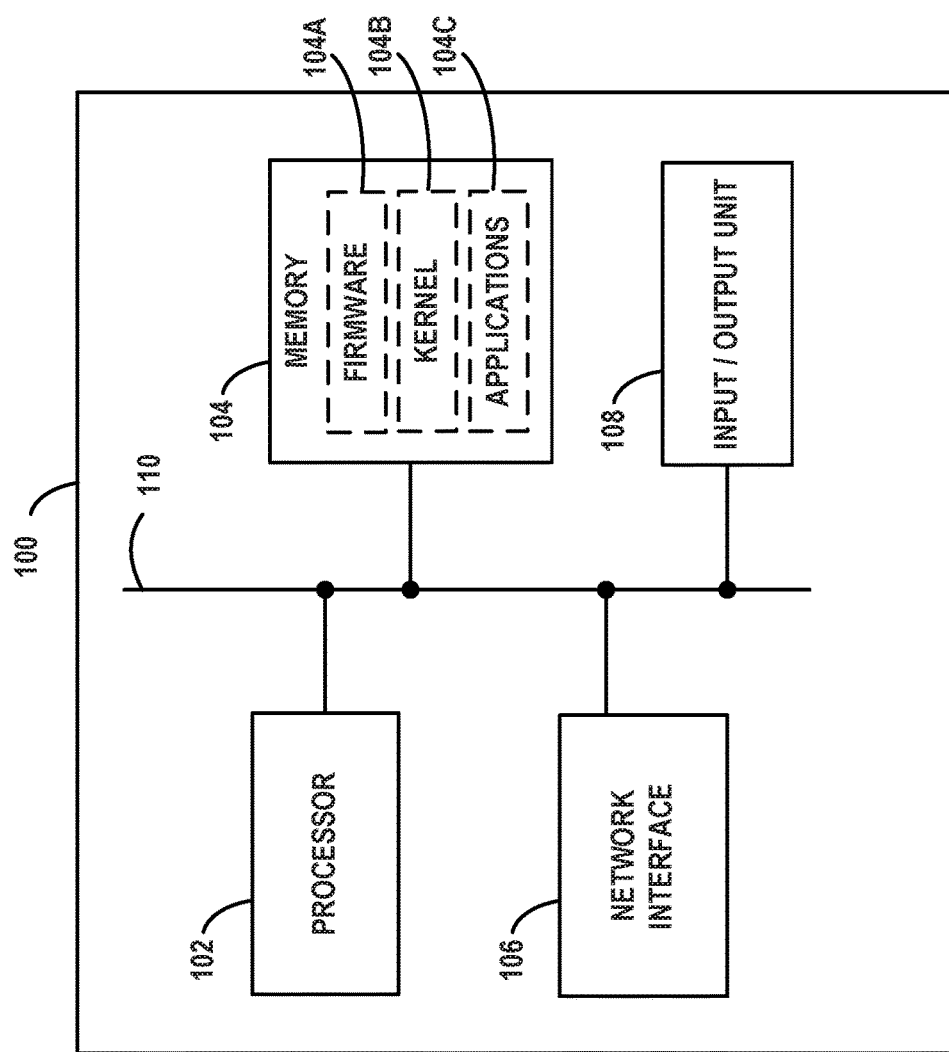
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
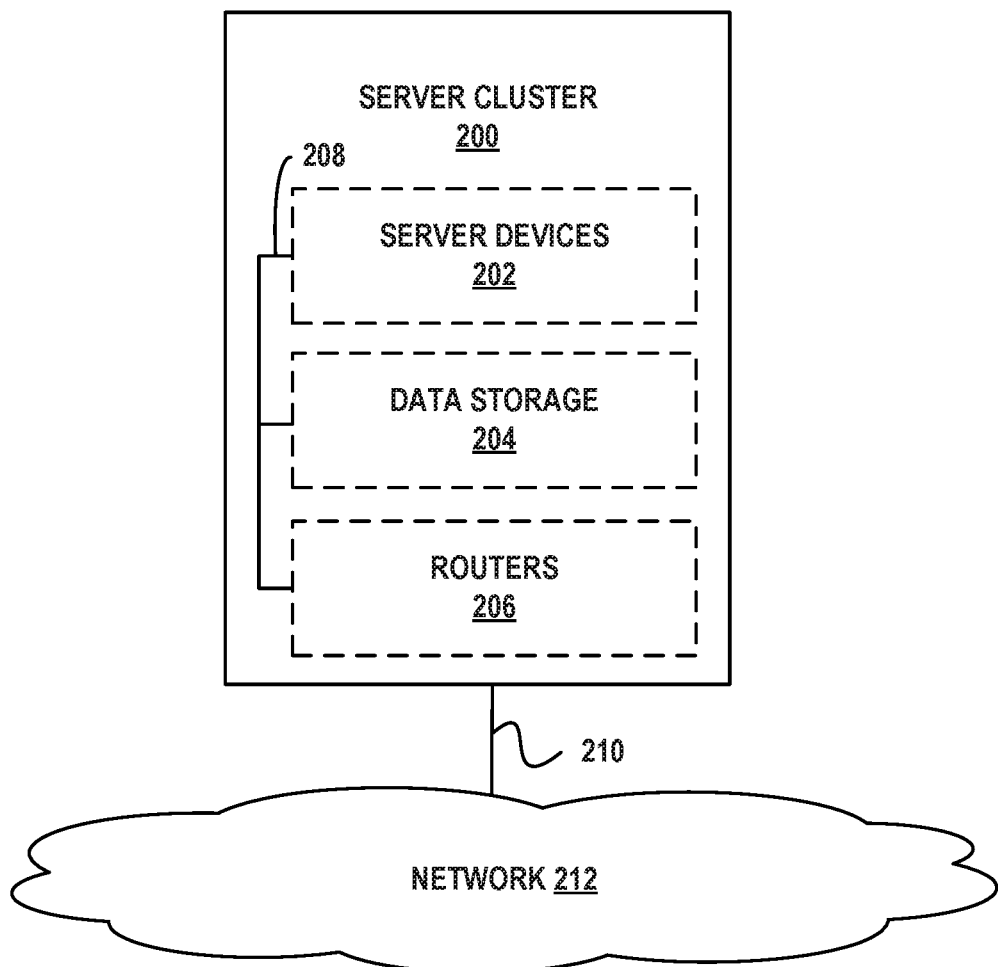
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
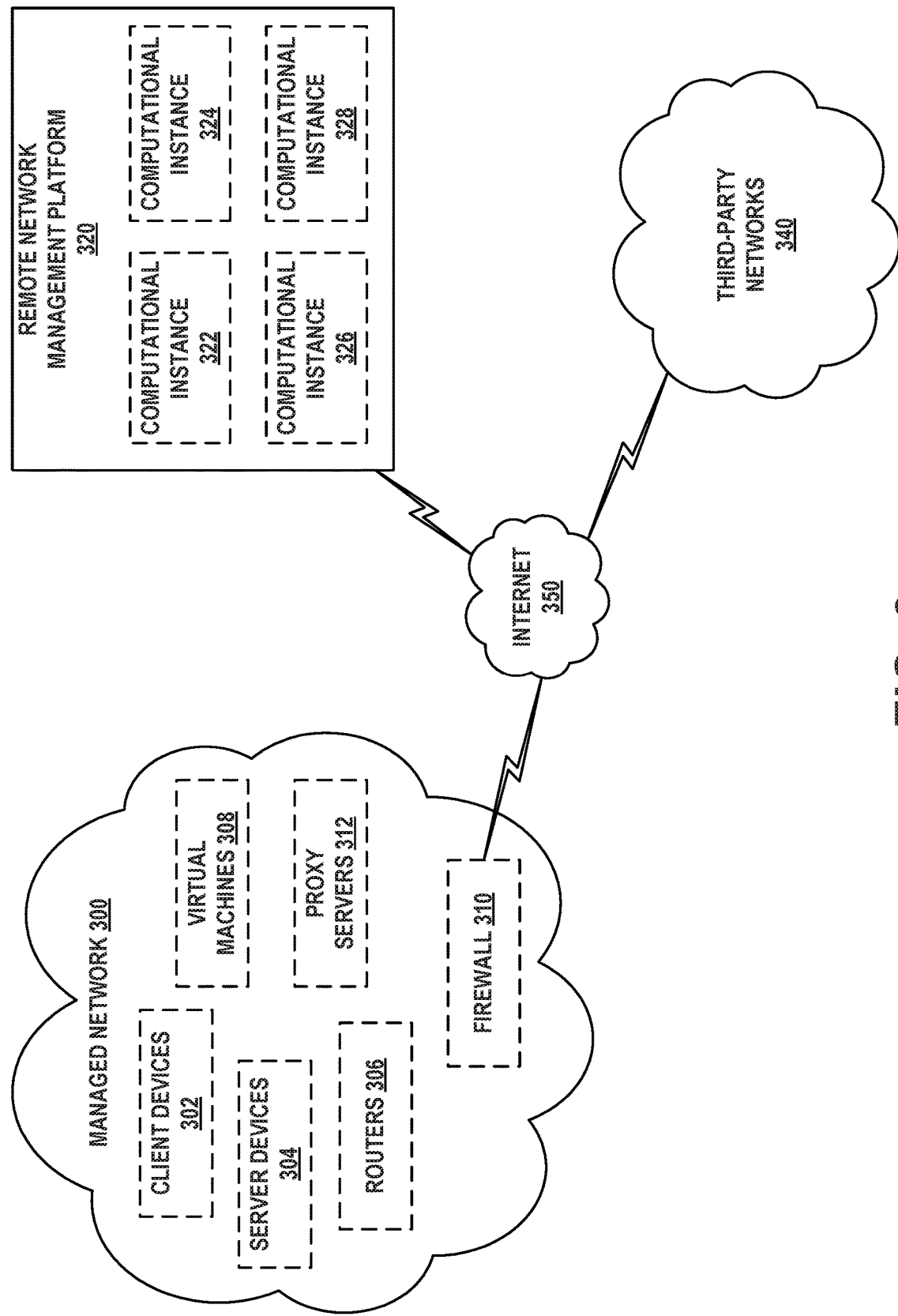
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
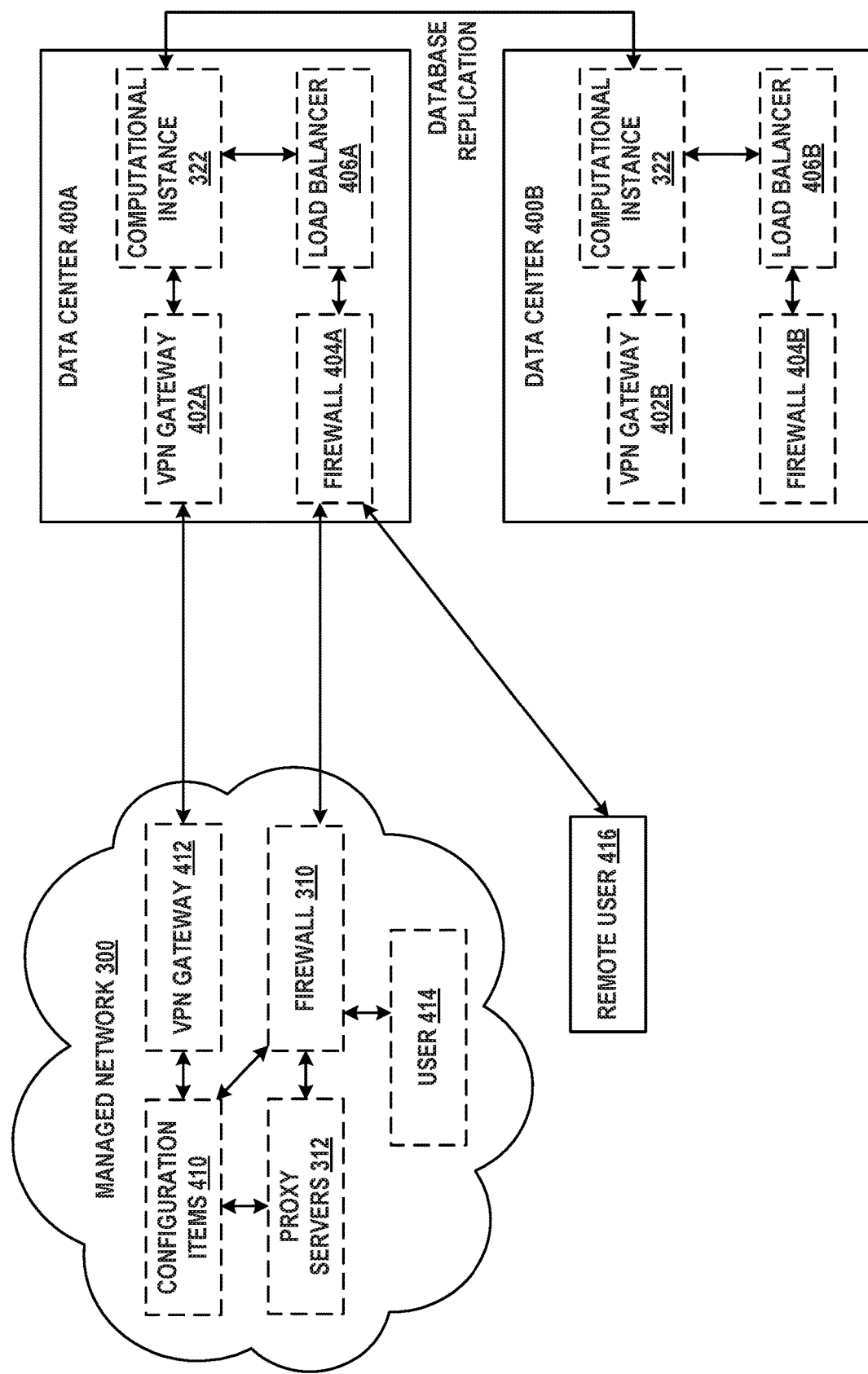
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
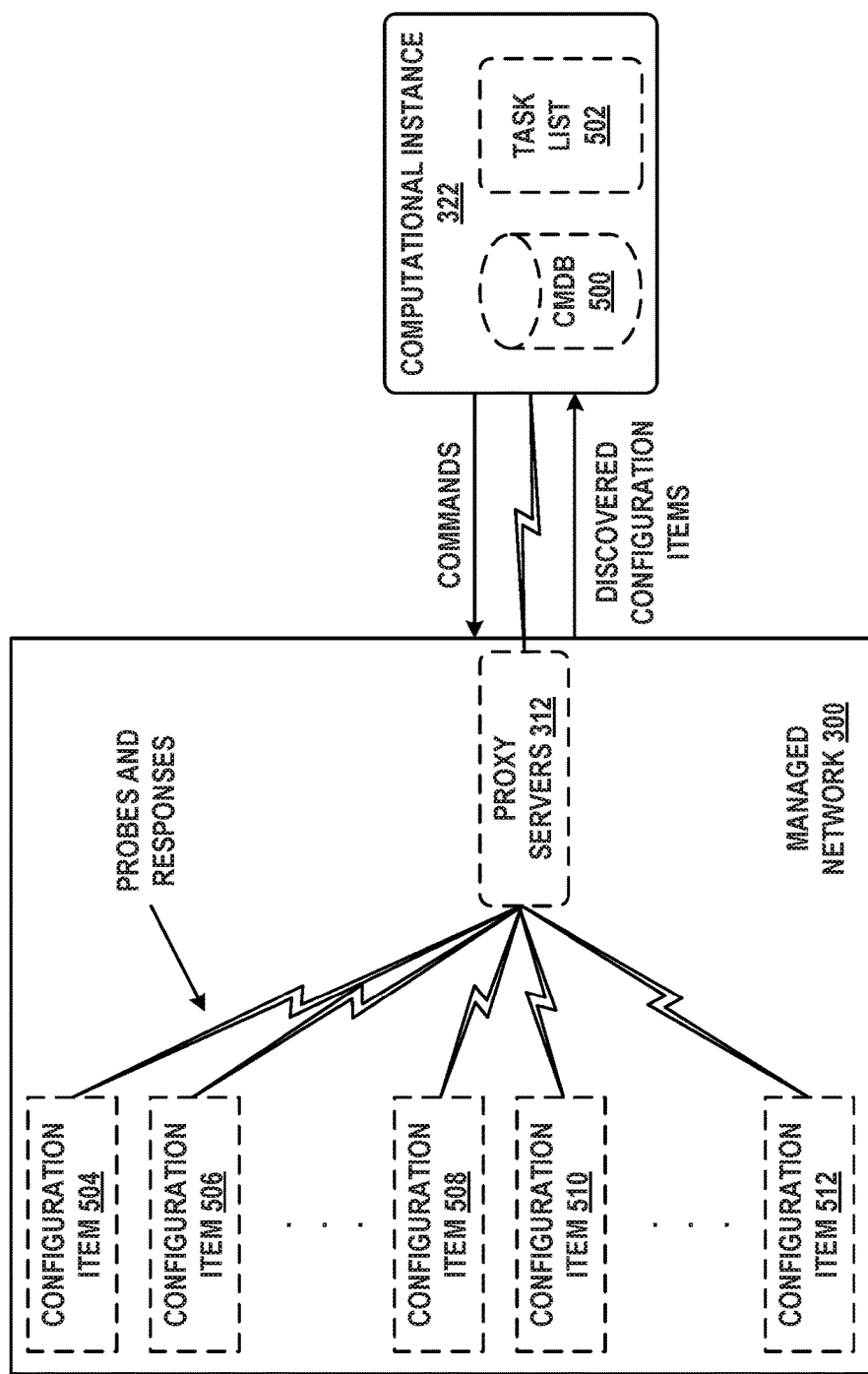
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
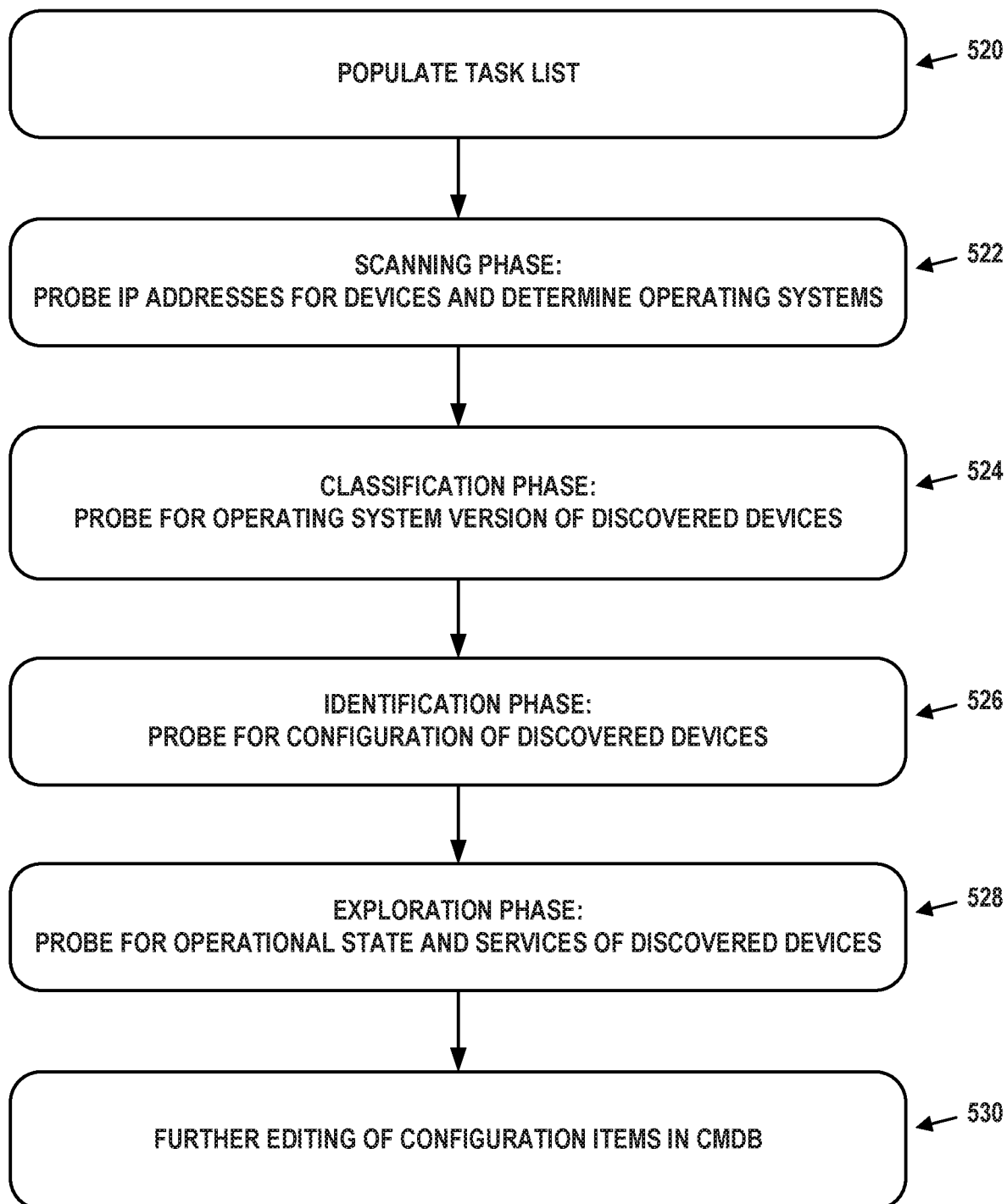
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation API. This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE AUTHENTICATION SYSTEM

Figure 6A:
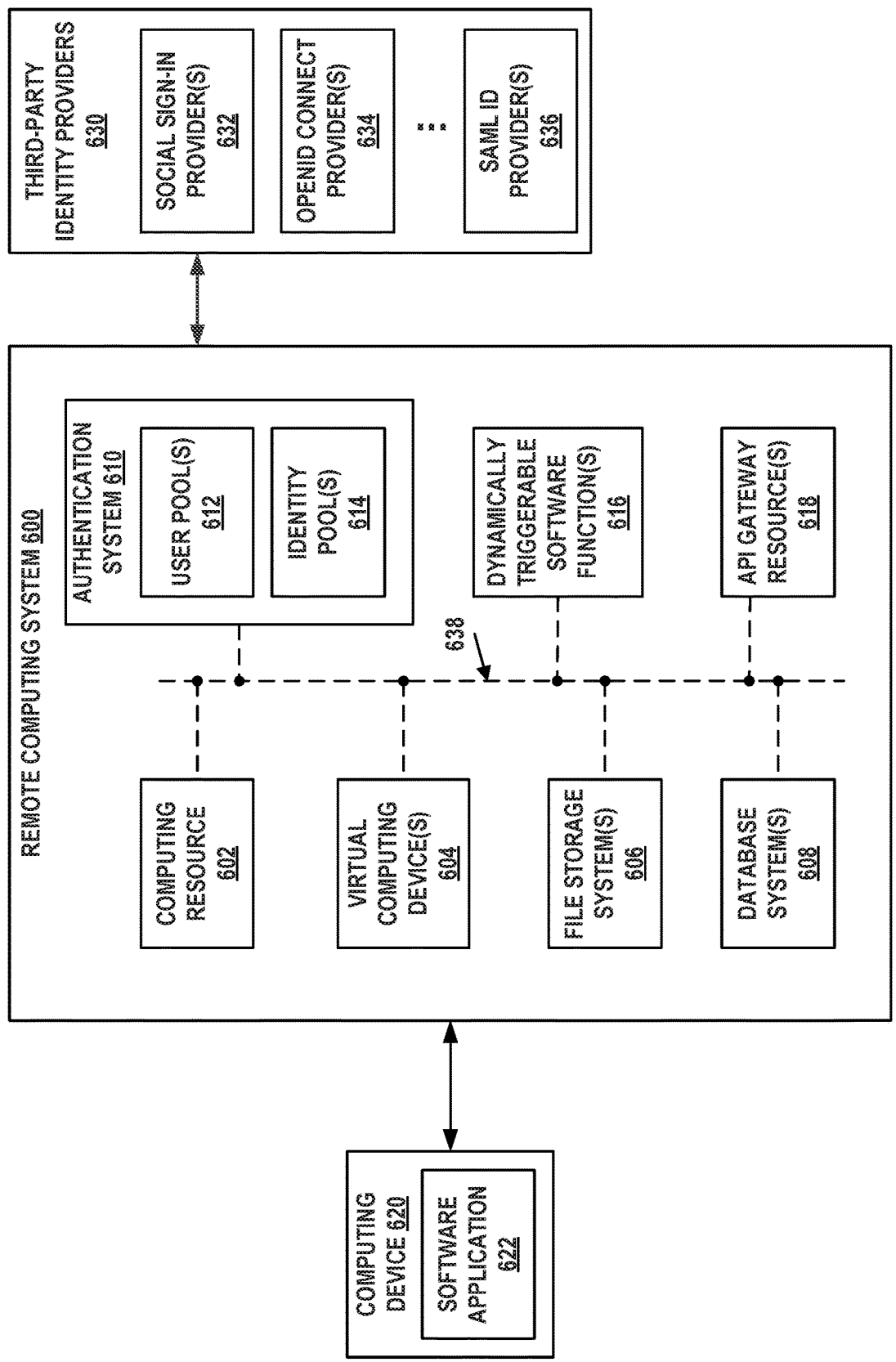
FIG. 6A illustrates a remote computing system, in accordance with example embodiments.

FIG. 6A illustrates an example remote computing system that provides an authentication system. Namely, remote computing system 600 includes authentication system 610 that may be used to control authentication, authorization, user management, and/or other access controls (collectively referred to herein as authentication). Authentication system 610 may be used to provide authentication to, for, and/or on behalf of computing resources within remote computing system 600, as well as computing resources outside of remote computing system 600. FIG. 6A additionally illustrates computing device 620 executing software application 622 which may benefit from the authentication process, as well as third-party identity providers 630 which may assist with the authentication process.

Remote computing system 600 may include a plurality of different computing resources, including software applications, virtual computing devices, data storage systems, APIs, and software functions, among other possibilities. For example, in addition to authentication system 610, remote computing system 600 may also include virtual computing device(s) 604, file storage system(s) 606, database system(s) 608, dynamically triggerable software function(s) 616, and API gateway resource(s) 618, among other components. Remote computing system 600 may represent a cloud-based computing environment such as AMAZON WEB SERVICES®, MICROSOFT® AZURE, GOOGLE CLOUD PLATFORM®, ALIBABA CLOUD®, or IBM® Cloud, among other possibilities.

Each of the computing resources in remote computing system 600 may be assigned a corresponding unique resource identifier. These unique resource identifiers may be used by the remote computing system 600 to, for example, direct communications between the computing resources therein. For example, the unique resource identifiers may direct traffic along interconnection network 638. The unique resource identifiers may also allow for unambiguous provisioning, modification, and deletion of computing resources, among other benefits. Each of the different types of computing resources may be associated with a different unique resource identifier content, thus allowing the type or class of a given computing resource to be determined or at least approximated based on the unique resource identifier thereof. These differences in unique resource identifier contents may be used during the discovery process to facilitate discovery and mapping of components of remote computing system 600.

Virtual computing device(s) 604 may be configured to provide a computing environment for execution of various software applications, programs, and/or processes. In the case of AMAZON WEB SERVICES®, virtual computing device(s) 604 may represent components of the AMAZON EC2® product.

File storage system(s) 606 (e.g., AMAZON SIMPLE STORAGE SERVICE®) may be configured to store files and/or other objects in containers, buckets, or other storage constructs. Storage system(s) 606 may be configured to store therein a plurality of different file types. Each file stored in storage system(s) 606 may be addressable using a corresponding unique identifier, such as a random alphanumeric string assigned to the file by file storage system(s) 606 or a filename assigned to the file by a client device requesting storage thereof.

Database system(s) 608 (e.g., AMAZON DYNAMODB®, AMAZON RDS®, or AMAZON REDSHIFT®) may include relational databases configured to store data in tables arranged into rows and columns, with a unique key identifying each row. Database system(s) 608 may thus use a structured query language (SQL) for querying and maintenance thereof. Database system(s) 608 may additionally or alternatively represent "not only SQL" (NoSQL) databases configured to store data in a plurality of additional formats or arrangements. For example, database system(s) 608 may store data as tables organized by columns (rather than rows), as key-value pairs (e.g., where each value stored in the database is assigned a corresponding key), as documents (e.g., JavaScript Object Notation (JSON) or XML files), or as graph structures (e.g., where data is stored as nodes that are interconnected by edges).

Dynamically triggerable software function(s) 616 (e.g., AMAZON LAMBDA® functions) may include respective code (e.g., source code, object code, configuration files, log files, and/or environmental variables) that defines at least part of the features, operations, and/or components of these software functions. Such code may be uploaded to remote computing system 600 by way of a computing device associated with managed network 300 such that the code is remotely hosted and executable by remote computing system 600 on behalf of managed network 300. Thus, dynamically triggerable software function(s) 616 may allow managed network 300 to offload management and resource allocation for execution of the code to remote computing system 600.

Dynamically triggerable software function(s) 616 may be executable on demand, which effectively allows managed network 300 to use computing resources of remote computing system 600 on an as-needed basis for executing dynamically triggerable software function(s) 616. For example, dynamically triggerable software function(s) 616 may be executed in response to one or more trigger events, which may indicate the need or demand to allocate computing resources to one or more of these software functions. An example trigger event may involve a client device transmitting, to one of dynamically triggerable software function(s) 616, a request for execution of a service or a software program, so that the client device receives certain information and/or carries out operations as a result of such execution. Thus, the trigger events may be initiated by entities outside of remote computing system 600, including, for example, a software application that is associated with managed network 300 or a software application that is associated with remote network management platform 320, among other possibilities.

Trigger events may also be initiated by entities inside of remote computing system 600. For example, trigger events may be initiated by a software application that is associated with remote computing system 600 or another one of the services hosted thereby, among other possibilities. For example, the trigger event may involve a modification of one or more components of file storage system(s) 606 and/or database system(s) 608.

API gateway resource(s) 618 (e.g., AMAZON® API Gateway) may be configured to facilitate the creation, publication, and maintenance of various aspects of APIs. Such APIs may be used to expose portions of one or more services or software applications executing on remote computing system 600. For example, API gateway resource(s) may handle API requests and responses that allow software application 622 to interact with the other components of remote computing system 600. API gateway resource(s) 618 may, for example, provide an API by way of which one or more of dynamically triggerable software function(s) 616 are accessible to software application 622.

Authentication system 610 (e.g., AMAZON COGNITO®) may include user pool(s) 612 and/or identity pool(s) 614. User pool(s) 612 may define a plurality of service identifiers (e.g., user accounts) usable to access one or more computing resources, both in and outside of remote computing system 600. User pool(s) 612 may thus provide one or more user directories that store authentication credentials of a plurality of users and therefore allow authentication system 610 to authenticate users. Namely, authentication system 610 may be configured to issue access tokens in response to receiving authentication credentials that match a record found in user pool(s) 612. User pool(s) 612 may be used, for example, to provide authentication services to a software application hosted outside of remote computing system 600 or to a software application hosted by computing resources of remote computing system 600.

In one implementation, authentication credentials may take the form of a username and password provided to authentication system 610 for verification. Authentication system 610 may verify the authentication credentials against user pool(s) 612 and issue access tokens in response to a successful verification. In another implementation, authentication system 610 may allow for authentication credentials to be provided by way of one or more of third-party identity providers 630. Third-party identity providers 630 may include social sign-in provider(s) 632 (e.g., GOOGLE®, FACEBOOK®), OpenID Connect provider(s) 634, and Security Assertion Markup Language (SAML) ID provider(s) 636. Authentication credentials may be provided to one of the third-party identity providers 630, which may responsively provide a third-party authentication token. This third-party authentication token may be provided to authentication system 610 to obtain a second authentication token. The second authentication token may allow access to the content for which access was initially sought (e.g., the software application deployed on computing resource 602).

On the other hand, identity pool(s) 614 may be used to provide direct access to one or more of the computing resources provided by remote computing system 600. Identity pool(s) 614 may rely on the access tokens obtained by way of user pool(s) 612 to issue temporary resource credentials that allow for such direct access to the computing resources. In some cases, user pool(s) 612 may be thought of as authorizing access to the front-end (i.e., the user-facing aspect) of a software application, while identity pool(s) 614 may be thought of as authorizing access to the back-end (e.g., server-side) services that the software application utilizes. Thus, for example, user pool(s) 612 may be used to authenticate a user of an application, while identity pool(s) 614 may be used to authenticate an administrator of the application. Notably, user pool(s) 612 and identity pool(s) 614 may, in some implementations, be combined into a single pool or expanded into three or more pools, each with a different use case. Regardless, authentication system 610 may be used to authenticate users, applications, and devices both in and outside of remote computing system 600.

Figure 6B:
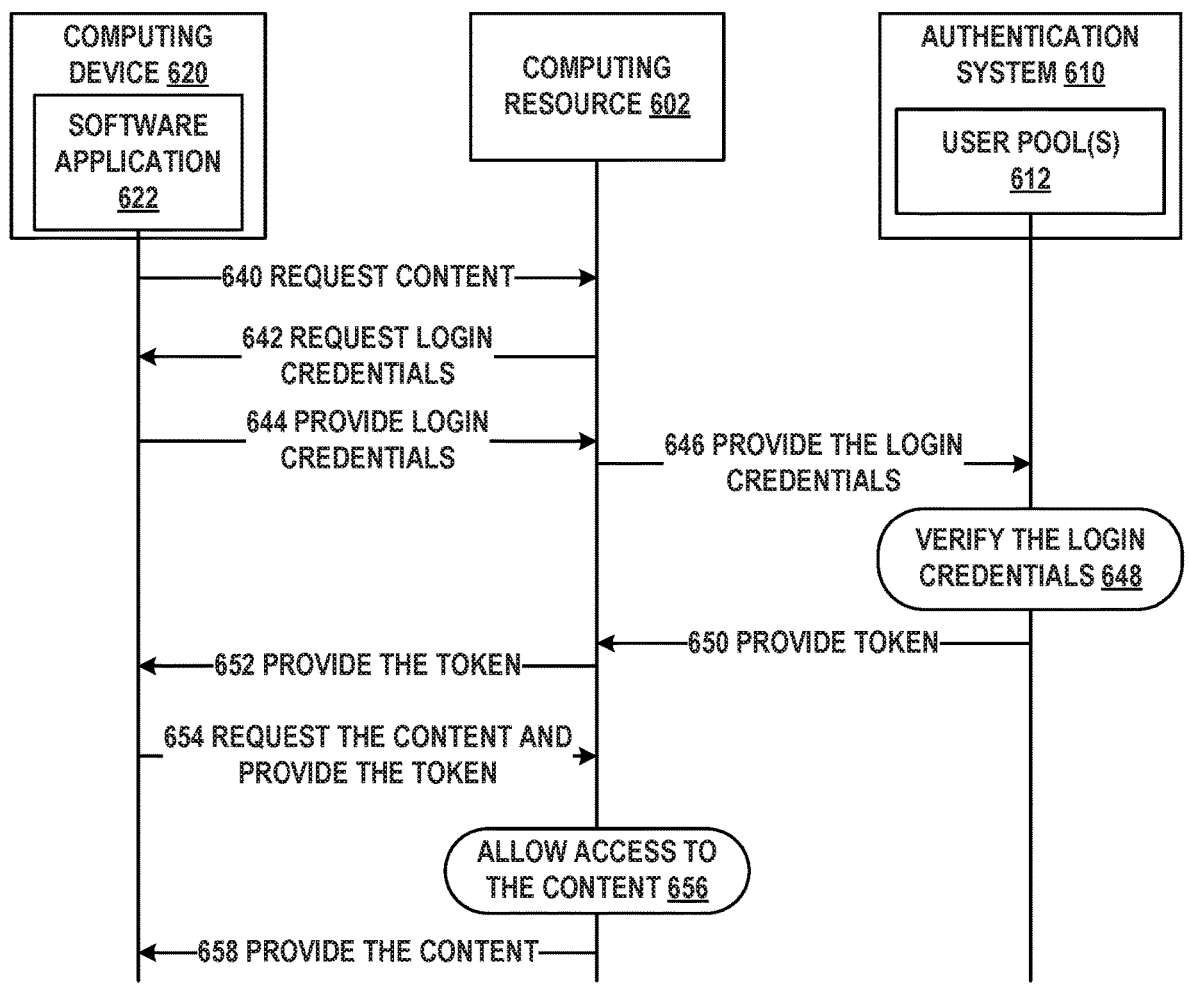
FIG. 6B illustrates a user pool authentication, in accordance with example embodiments.

FIG. 6B illustrates a message flow diagram of an example authentication process that utilizes user pool(s) 612. Namely, computing resource 602 may represent, for example, a web-based software application which may be accessible by way of software application 622 (e.g., a web browser) executing on computing device 620. Software application 622 may be configured to transmit to computing resource 602 a request for content, as indicated by arrow 640. Based on or in response to the request at arrow 640, computing resource may be configured to transmit to software application 622 a request for login credentials, as indicated by arrow 642. Based on or in response to the request at arrow 642, software application 622 may be configured to provide the login credentials (e.g., username and password).

Rather than implement its own independent user management system, computing resource 602 may utilize authentication system 610 to handle user authentication. Accordingly, based on or in response to reception of the credentials at arrow 644, computing resource 602 may be configured to transmit the login credentials to authentication system 610. Based on or in response to reception of the login credentials at arrow 646, authentication system 610 may be configured to verify the login credentials against user pool(s) 612, as indicated by block 648. If the login credentials match a record found in user pool(s) 612, authentication system 610 may be configured to generate and provide a token to computing resource 602, as indicated by arrow 650. The token may be, for example, a JSON Web Token (JWT).

Based on or in response to reception of the token at arrow 650, computing resource 602 may be configured to transmit the token to software application 622 to be used to authenticate interactions therebetween. Thus, based on or in response to reception of the token at arrow 652, software application 622 may be configured to transmit, to computing resource 602, a request for the content along with the obtained token. Based on or in response to reception of the request for content and the token at arrow 654, computing resource may be configured to allow access to the content, as indicated at block 656, and transmit the content to software application 622, as indicated by arrow 658. Notably, computing resource 602 may utilize one or more other computing resources of remote computing system 600 in the process of accessing and providing the content at block 656 and arrow 658. However, these other computing resources might not be directly accessible to software application 622.

Figure 6C:
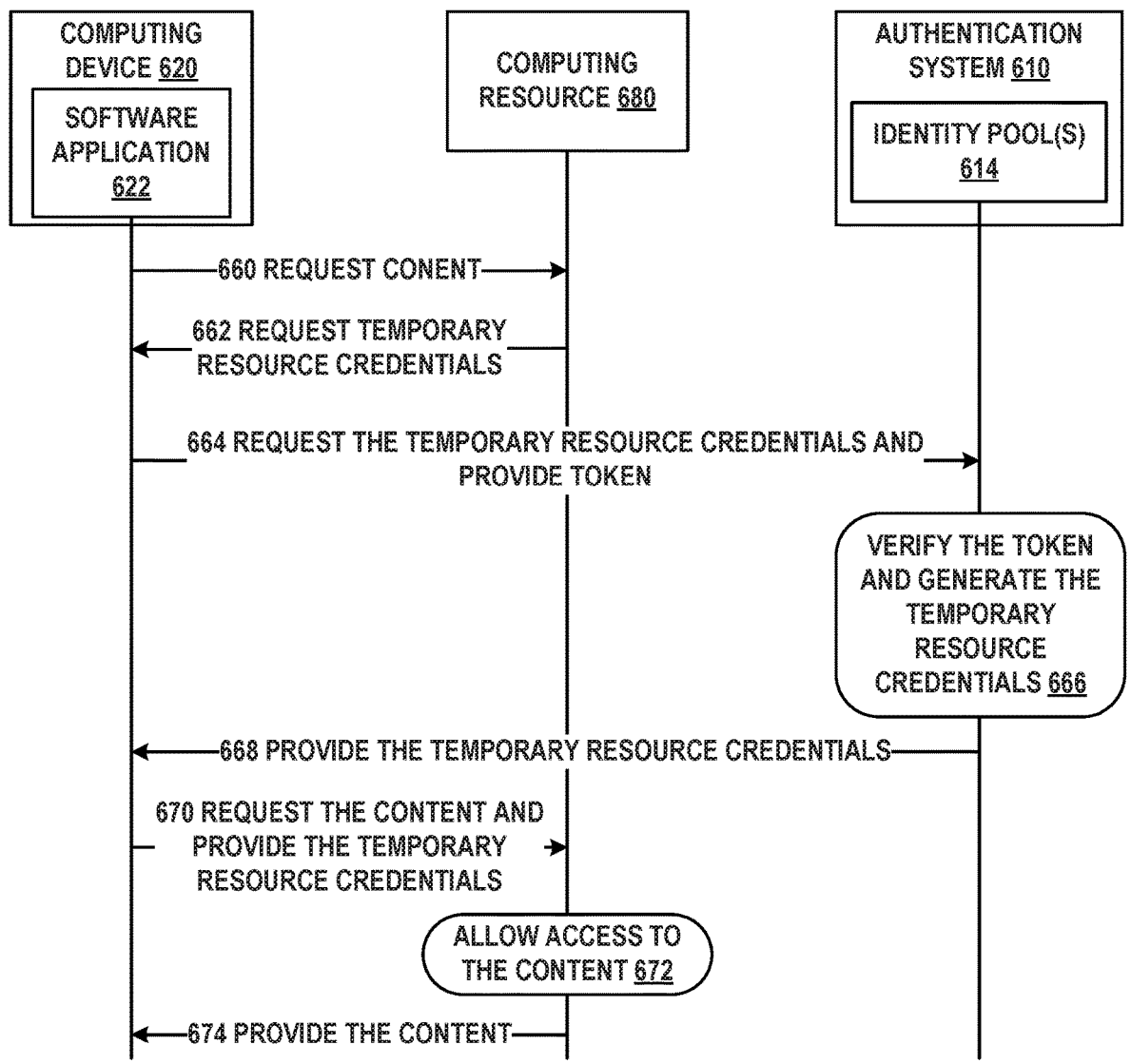
FIG. 6C illustrates an identity pool authentication, in accordance with example embodiments.

In order to interact with these other computing resources in remote computing system 600 directly, rather than by way of computing resource 602, software application 622 may provide the access tokens to authentication system 610 in exchange for temporary resource credentials, as illustrated in FIG. 6C. The temporary resource credentials may be configured to allow direct access to one or more computing resources within remote computing system 600. For example, the temporary resource credentials may allow software application 622 to view the contents of a database used by the software application executing on computing resource 602, and this viewing may be accomplished independently of any interaction with computing resource 602.

Accordingly, software application 622 may be configured to request content from computing resource 680, as indicated by arrow 660. Computing resource 680 may represent one or more of the virtual computing devices, file storage systems, database systems, software functions, and/or API gateways of remote computing system 600. Based on or in response to reception of the request at arrow 660, computing resource 680 may be configured to request, from software application 622, temporary resource credentials for accessing the contents of computing resource 680, as indicated by arrow 662. Based on or in response to the request at arrow 662, software application 622 may be configured to request the temporary resource credentials from authentication system 610, as indicated by arrow 664. The request at arrow 664 may include therein the token acquired by software application at arrow 652 in FIG. 6B.

Based on or in response to the request at arrow 664, authentication system 610 may be configured to verify the token and, if successfully verified, generate the temporary resource credentials, as indicated by block 666. Notably, authentication system 610 may rely on identify pool(s) 614 to generate the temporary resource credentials. For example, identify pool(s) 614 may associate the token with temporary resource credentials of a particular scope. The scope may define the subset of computing resources within remote computing system 600 that are accessible and the manner in which these computing resources may be interacted with (e.g., read, write, create, delete, etc.), among other possibilities. Thus, identify pool(s) 614 may allow different tokens to grant access to different subsets of the computing resources of remote computing system 600. In some implementations, the scope associated with each token may be adjustable for each user pool and/or for each individual user.

Based on or in response to generating the temporary resource credentials at block 666, authentication system 610 may be configured to transmit the temporary resource credentials to software application 622, as indicated by arrow 668. Based on or in response to reception of the temporary resource credentials at arrow 668, software application 622 may be configured to request the content from computing resource 680 and provide thereto the temporary resource credentials, as indicated by arrow 670. Based on or in response to reception of the request at arrow 670, computing resource 680 may be configured to provide access to the content, as indicated by block 672, and transmit the content to software application 622, as indicated by arrow 674. The temporary resource credentials may expire after a predetermined period of time, thus allowing future interactions to take into account any changes in the scope of a token associated with a given user.

VII. EXAMPLE DISCOVERY AND MAPPING OPERATIONS

Figure 7A:
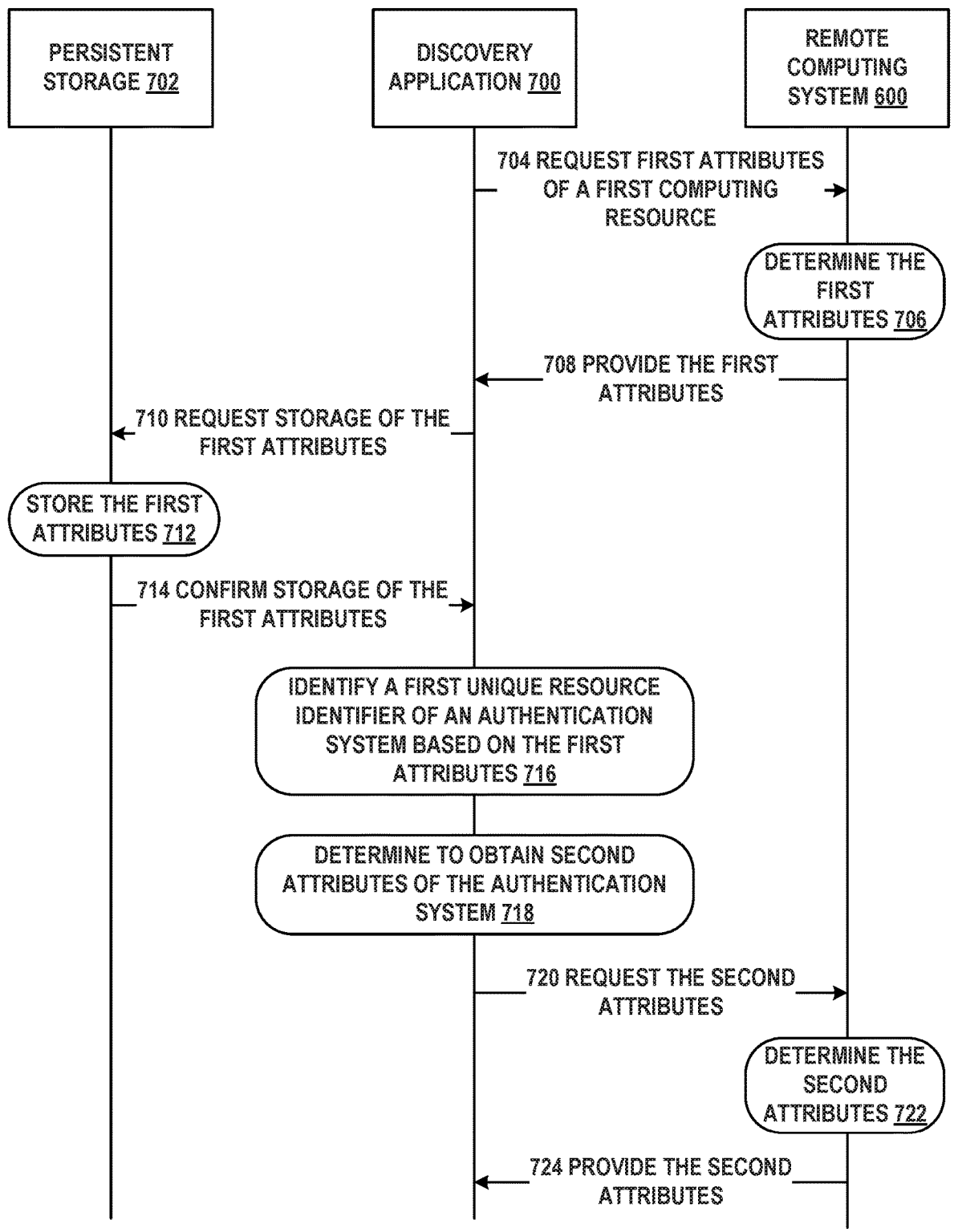
FIGS. 7A and 7B illustrate a message flow diagram, in accordance with example embodiments.
Figure 7B:
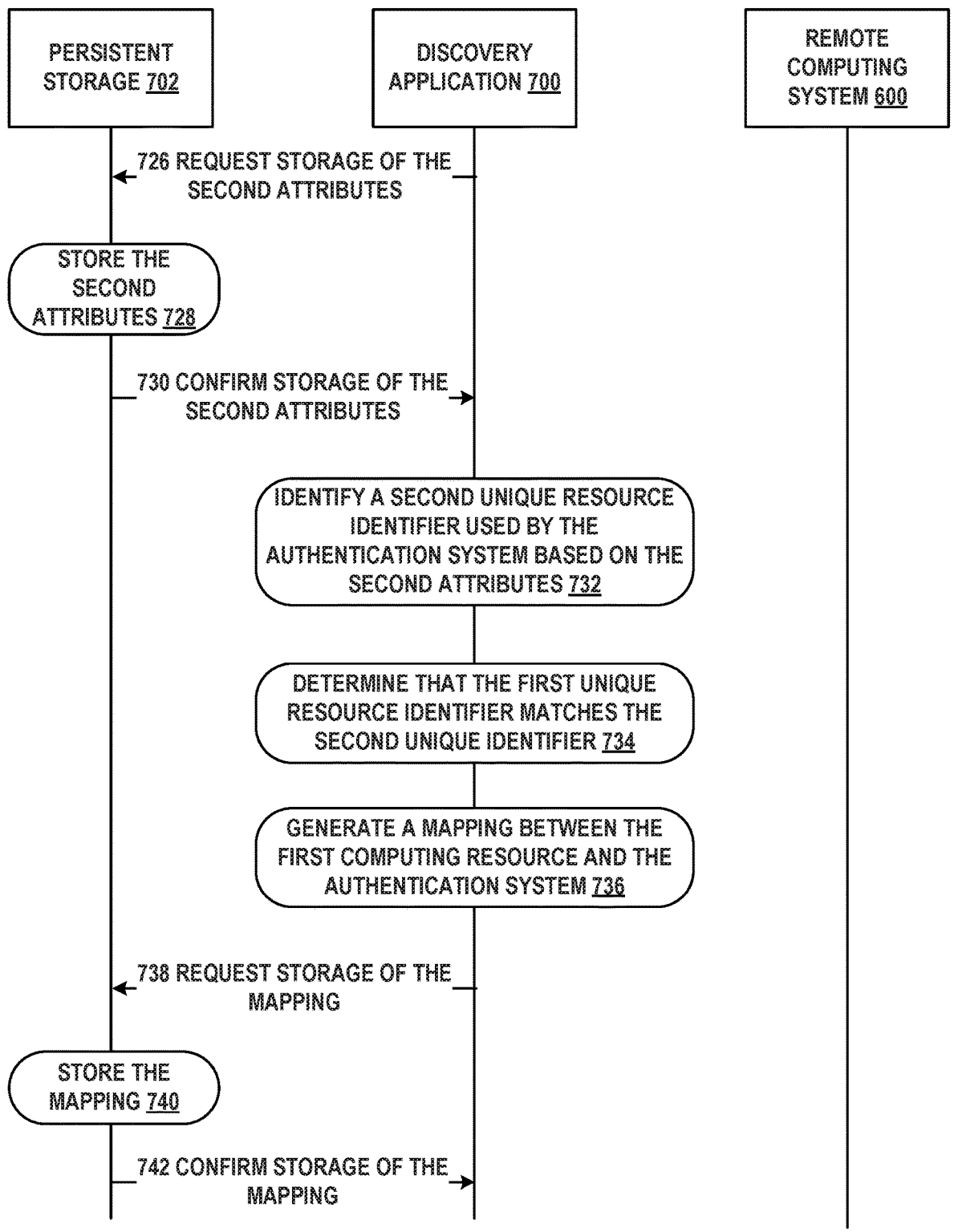

FIGS. 7A and 7B illustrate message flow diagrams of operations involved in discovering and mapping elements of a remote computing system. Specifically, FIGS. 7A and 7B illustrates discovery application 700, persistent storage 702, and remote computing system 600. Persistent storage 702 may, in some implementations, include and/or take the form of a database. In one example, discovery application 700 and persistent storage 702 may be disposed in or form part of a computational instance (e.g., computational instance 322) of remote network management platform 320. This computational instance may be assigned to managed network 300, and thus used to discover, map, and/or adjust various systems associated therewith. To that end, discovery application 700 may be configured to communicate with remote computing system 600 over a network such as the Internet. In another example, portions of discovery application may be disposed in, form part of, or be executed with the assistance of proxy servers 312. For example, some or all portions of a discovery pattern deployed by discovery application 700 may be executed by proxy servers 312.

Discovery application 700 may initiate the discovery and mapping process by obtaining a service identifier for remote computing system 600. The service identifier may include a username and password combination, a web token (e.g., a JSON Web Token), or another form of credentials that allows discovery application 700 to connect to and obtain information regarding remote computing system 600. The service identifier may also include or be associated with a URL, or another identifier, that addresses remote computing system 600. The service identifier may thus also allow discovery application 700 to disambiguate remote computing system 600 from other available remote computing systems. In some implementations, discovery application 700 may obtain the service identifier by way of a user interface.

Based on or in response to obtaining the service identifier, discovery application 700 may be configured to request first attributes of a first computing resource (e.g., computing resource 602), as indicated by arrow 704. This request, as well as some subsequent requests to remote computing system 600, may take on a plurality of different forms or formats. In one example, remote computing system 600 may provide an API configured to generate and provide the information requested by discovery application 700. The API may be, for example, a representational state transfer (REST) API accessible by way of hypertext transfer protocol (HTTP) requests and configured to provide the requested information in HTTP responses.

The request at arrow 704 may thus specify one or more of (i) a base address of the API, (ii) a specific function of the API configured to provide the requested information, (iii) input values for the specific function of the API, and/or (iv) portions of the service identifier that authenticate discovery application 700.

For example, the request at arrow 704 may be transmitted to "COMP_SYS.COM/GET_ATTRIBUTES/FIRST_COMPUTING_RESOURCE", where "COMP_SYS.COM" represents the base address of the API, "GET_ATTRIBUTES" specifies the function of the API configured to generate attributes of various computing resources, and "FIRST_COMPUTING_RESOURCE" is an input to the function that specifies the computing resource for which the attributes are requested. The request may contain in HTTP headers thereof the authentication credentials from the service identifier used to access remote computing system 600.

Based on or in response to reception of the request at arrow 704, remote computing system 600 may be configured to determine the first attributes, as indicated by block 706. Determining the first attributes may involve executing an API function specified by the request at arrow 704. Based on or in response to determining the first attributes at block 706, remote computing system 600 may be configured to transmit, to discovery application 700, the first attributes, as indicated by arrow 708. Based on or in response to reception of the first attributes at arrow 708, discovery application 700 may be configured to request storage of the first attributes in persistent storage 702, as indicated by arrow 710. Based on or in response to reception of the request at arrow 710, persistent storage may be configured to store the first attributes, as indicated by block 712. Based on or in response to storage of the first attributes at block 712, persistent storage may be configured to transmit, to discovery application 700, confirmation of storage of the first attributes, as indicated by arrow 714.

Discovery application 700 may be configured to identify a first unique resource identifier of an authentication system (e.g., authentication system 610) based on the first attributes, as indicated by block 716. The operations of block 716 may be carried out based on or in response to reception of the first attributes at arrow 708 or the confirmation at arrow 714. The first unique resource identifier may be identified in different ways depending on the type of the first computing resource. Namely, the type of the first computing resource may dictate the format and content of the first attributes.

In a first example, when the first computing resource is one of dynamically triggerable software function(s) 616, the first attributes may include programmatic code that defines the dynamically triggerable software function. This programmatic code may reference therein the first unique resource identifier. For example, the programmatic code may indicate that the computing resource identified by the first unique resource identifier is to be used for authentication when no token is presented along with the request to execute the dynamically triggerable software function. Similarly, when the first computing resource represents API gateway resource(s) 618, the first unique resource identifier may be identified by parsing the source code that defines the functions of the API(s) thereof.

In another example, the first computing resource may be a data storage structure, such as a container of file storage system(s) 606 or a database of database system(s) 608. Accordingly, the first attributes may include contents of the data storage structure and/or metadata associated with the data storage structure. The first unique identifier may be contained in these contents or metadata, and may thus be identified by parsing the contents and/or metadata. For example, a database may store the first unique resource identifier on behalf of a software application in order to allow the software application to keep track of the plurality of authentication methods available to the application's users. In another example, the metadata of the database may store the first unique resource identifier to indicate that authentication system 610 is to be used to login to access the contents of the database.

In a further example, the first attributes may include a definition of one or more trigger events. Notably, many, if not all, types of computing resources of remote computing system 600 may be configured to either respond to trigger events or invoke execution of other computing resources in response to the occurrence of a trigger event. For example, dynamically triggerable software function(s) 616 may be executed in response to reception of a request from another computing resource. In another example, when one replica of a database of database system(s) 608 is modified, such modifications may be propagated among any other geographically-distributed replicas of the database. Thus, the trigger events may allow the database to synchronize each of its replicas in near-real time. In further examples, trigger events may also cause the first computing resource to provide access to other computing resources, such as containers of file storage system(s) 606. A given trigger event may identify any computing resources associated with the given trigger event using the resources' respective unique resource identifiers. Accordingly, parsing the definitions of the trigger events in the first attributes may allow discovery application 700 to identify other related computing resources within remote computing system 600.

Notably, the first attributes may additionally include therein one or more additional unique resource identifiers of computing resources other than authentication system 610. For example, the first computing resource may interact with virtual computing device(s) 604, file storage system(s) 606, database system(s) 608, dynamically triggerable software function(s) 616, and/or API gateway resource(s) 618, among other possible computing resources. Such interaction may be indicated by the presence of a corresponding unique resource identifier in the attributes of the first computing resource.

The unique resource identifiers of different types of computing resources of remote computing system 600 may be disambiguated from one another on the basis of the content of the unique resource identifier. In the example of AMAZON WEB SERVICES®, the unique resource identifier of a particular computing resource may be a combination of (i) the partition of remote computing system 600 in which the particular computing resource is disposed, (ii) a service name of the particular computing resource, (iii) a geographic region in which the particular computing resource resides, (iv) an account associated with the particular computing resource, and/or (v) an alphanumeric identifier associated with the particular computing resource. Thus, the unique resource identifier (e.g., the AMAZON® Resource Name (ARN)) format may be "arn:partition:service_name:region:account:alphanumeric_id".

Notably, one or more of these fields may be indicative of the computing resource type, and may be the same across different instantiations of computing resources of the same type. In the case of AMAZON WEB SERVICES®, for example, the service_name may be indicative of the type of computing resource. For example, the AMAZON SIMPLE STORAGE SERVICE® may be identified by the service_name "s3" (e.g., "arn:partition:s3:::alphanumeric_id"). Similarly, the AMAZON COGNITO® authentication system may be identified by the service_name "cognito-idp" (e.g., "arn:partition:cognito-idp:region:account:userpool:alphanumeric_id"). Notably, other remote computing systems may use a different format for the unique resource identifier. Nevertheless, some portions of the unique resource identifier may remain constant, or at least similar, across computing resources of the same type.

Based on identifying the type of computing resource associated with a given unique resource identifier determined from the attributes, discovery application 700 may select one or more discovery patterns to be employed in further discovery and mapping operations. Namely, discovery application 700 may be configured to discover and map different types of computing resources within remote computing system 600 using different discovery patterns. Generally speaking, a discovery pattern is a series of operations that instruct a software application carrying out discovery (e.g., discovery application 700) what credentials to use to access the cloud-based system, what computing resources therein to discover, and what CMDB tables to populate with representations of these computing resources. Each discovery pattern may define a series of operations configured to discover and map aspects of its corresponding type of computing resource. Accordingly, by identifying the unique resource identifiers and the types of computing resources to which these identifiers correspond, discovery application

700 may select and execute discovery patterns that focus on these types of computing resources.

Specifically, the unique resource identifiers determined from the first attributes by discovery application 700 may allow for (i) selection of the correct discovery patterns to be executed and (ii) deployment of the selected discovery patterns against specific instantiations of the corresponding computing resource types. Namely, each unique resource identifier determined by discovery application 700 may indicate an entry point usable by discovery application 700 to conduct discovery and mapping. That is, each unique resource identifier may indicate a specific instantiation of a computing resource that is associated with discoverable attributes and mappable relationships. Thus, in response to obtaining a particular unique resource identifier, discovery application 700 may be configured to determine an entry point against which additional discovery patterns may be executed. In other words, identifying unique resource identifiers allows discovery application 700 to continue discovery and mapping of other computing resources in remote computing system 600 that are related to the first computing resource.

Accordingly, based on or in response to identifying the first unique resource identifier (which corresponds to authentication system 610) at block 716, discovery application 700 may be configured to determine to obtain second attributes of the authentication system, as indicated by block 718. Obtaining the second attributes may involve selecting a discovery pattern specific to the authentication system and executing the discovery pattern by discovery application 700 to obtain second attributes of the authentication system.

Accordingly, discovery application 700 may be configured to transmit, to remote computing system 600, a request for the second attributes of the authentication system, as indicated by arrow 720. In the example of the AMAZON COGNITO® authentication system, the request may be transmitted to "cognito-idp.region.amazonaws.com" via the HTTP "POST" method. The HTTP header of the request may include a first field "X-Amz-Target:AWSCognitoIdentityProviderService.ListUserPools" requesting that the API function return a list of the user pools provided by the authentication system, and a second field "Content-Type: application/x-amz-json-1.0" specifying the format in which the response is to be provided (i.e., JSON). Notably, requests transmitted to other remote application systems may vary.

Based on or in response to reception of the request at arrow 720, remote computing system 600 may be configured to determine the second attributes of the authentication system, as indicated by block 722. The attributes may be determined by the API function, and may be arranged according to a format specified by the request at arrow 720. Notably, in some implementations, the amount and/or level of detail of the second attributes may be specified by the request at arrow 720. The second attributes may identify, for example, the user pools of the authentication system, the identity pools of the authentication system, the unique resource identifier of the authentication system, the partition of the remote computing system in which the authentication system is disposed, a geographic region and/or data center in which the authentication system is disposed, an account with which the authentication system is associated, and/or any alphanumeric identifiers associated with the authentication system, among other attributes.

Based on or in response to determination of the attributes at block 722, remote computing system 600 may be configured to transmit the second attributes to discovery application 700, as indicated by arrow 724. Based on or in response to reception of the second attributes at arrow 724, discovery application 700 may be configured to store the second attributes, as indicated by arrow 726, block 728, and arrow 730 shown in FIG. 7B.

Based on or in response to determination of the attributes at block 722 and/or reception of the confirmation at arrow 730, discovery application 700 may be configured to identify, based on the second attributes, a second unique identifier used by the authentication system. In some implementations, the second unique identifier may be explicitly stated by the second attributes. For example, one of the second attributes may set forth an alphanumeric string that constitutes the second unique identifier. In other implementation, the second unique identifier may be generated or assembled by combining two or more of the second attributes according to a predefined format. In the case of AMAZON WEB SERVICES®, for example, the predefined format may be "am:partition:service_name:region:account:alphanumeric_id", as defined above. Accordingly, discovery application 700 may be configured to parse the second attributes to identify therein each of the fields that make up the unique resource identifier.

Based on or in response to identifying the second unique identifier at block 732, discovery application 700 may be configured to determine that the first unique identifier matches the second unique identifier, as indicated by block 734. To that end, discovery application 700 may be configured to retrieve, from persistent storage 702, the configuration items that define at least the first unique identifier. Discovery application 700 may then compare the first unique identifier to the second unique identifier and, based on the comparison, determine whether the two are the same or different. In other words, discovery application 700 may determine whether the authentication system used by the first computing resource is the same as the authentication system discovered by the operations of arrow 720 through block 732.

Based on or in response to determining that the first and second unique identifiers match at block 736, discovery application 700 may be configured to generate a mapping between the first computing resource and the authentication system, as indicated by block 736. The mapping may indicate that the first computing resource utilizes the authentication system to control access to the first computing resource. The mapping may be visually displayed by discovery application 700 (or by a different application at a later point in time) to illustrate each of the first computing resource and the authentication system as nodes. These nodes may be connected to one another by an edge to show that access to the first computing resource is controlled by the authentication system. Based on or in response to generating the mapping at block 736, discovery application 700 and persistent storage 702 may be configured to store the mapping, as indicated by arrow 738, block 740, and arrow 742.

The operations of FIGS. 7A and 7B, or portions thereof, may be repeated to identify relationships between additional other computing resources. Namely, one or more additional computing resources may be mapped to the authentication system to indicate that these additional computing resources also use authentication system for access control. Similarly, further computing resources may be mapped to the first computing resource, thus generating a large map that indicates how each of the computing resources within remote computing system 600 relate to and coordinate with one another.

In one example, a third computing resource may, based on its attributes, be mapped to the first computing resource. The first computing resource is, in turn, mapped to the authentication system. Accordingly, discovery application 700 may determine that the third computing resource uses the authentication system by way of the first computing resource. For example, one of the attributes of the third computing resource may indicate that access to the third computing resource is controlled or restricted (e.g., a token is needed to access the third computing resource). Additionally, the third computing resource may be mapped to the first computing resource, but not to other computing resources. Accordingly, discovery application 700 may determine that the first computing resource acts as a gateway to the third computing resource, and thus authentication system also indirectly controls access to the third computing resource. Notably, this may be the case with API gateway resource(s) 618, which provides interfaces to other computing resources within remote computing system 600.

In some embodiments, the authentication system may be discovered independently of the first computing resource. That is, an event other than finding the first unique resource identifier in the first attributes may trigger discovery of the authentication system. For example, a user may manually provide the second unique resource identifier of the authentication system, thus initiating discovery and mapping of the authentication system. In some such cases, the authentication system may be discovered before the first computing resource. Accordingly, in order to determine whether the first and second unique identifiers are a match, the configuration items that represent the second attributes may be retrieved and parsed to determine whether the first unique resource identifier is represented thereby. In other words, the attributes of computing resources may be discovered in many different orders. However, since these attributes are stored as configuration items in persistent storage, they may be retrieved and parsed for connections as additional computing resources are discovered.

Further, in some cases, the first computing resource that is mapped to the authentication system may alternatively be disposed outside of remote computing system 600. Namely, discovery application 700 may be configured to discover and map a plurality of different computing systems. Thus, even when the first computing resource is not disposed in remote computing system 600, the attributes thereof may nevertheless contain or indicate the unique resource identifier of the authentication system used by the first computing resource. For example, the first computing resource may be hosted by MICROSOFT® AZURE® while utilizing the AMAZON COGNITO® authentication system. The determined mapping may thus indicate a relationship between these two different remote computing systems and the specific individual components therein.

VIII. ADDITIONAL EXAMPLE OPERATIONS

Figure 8:
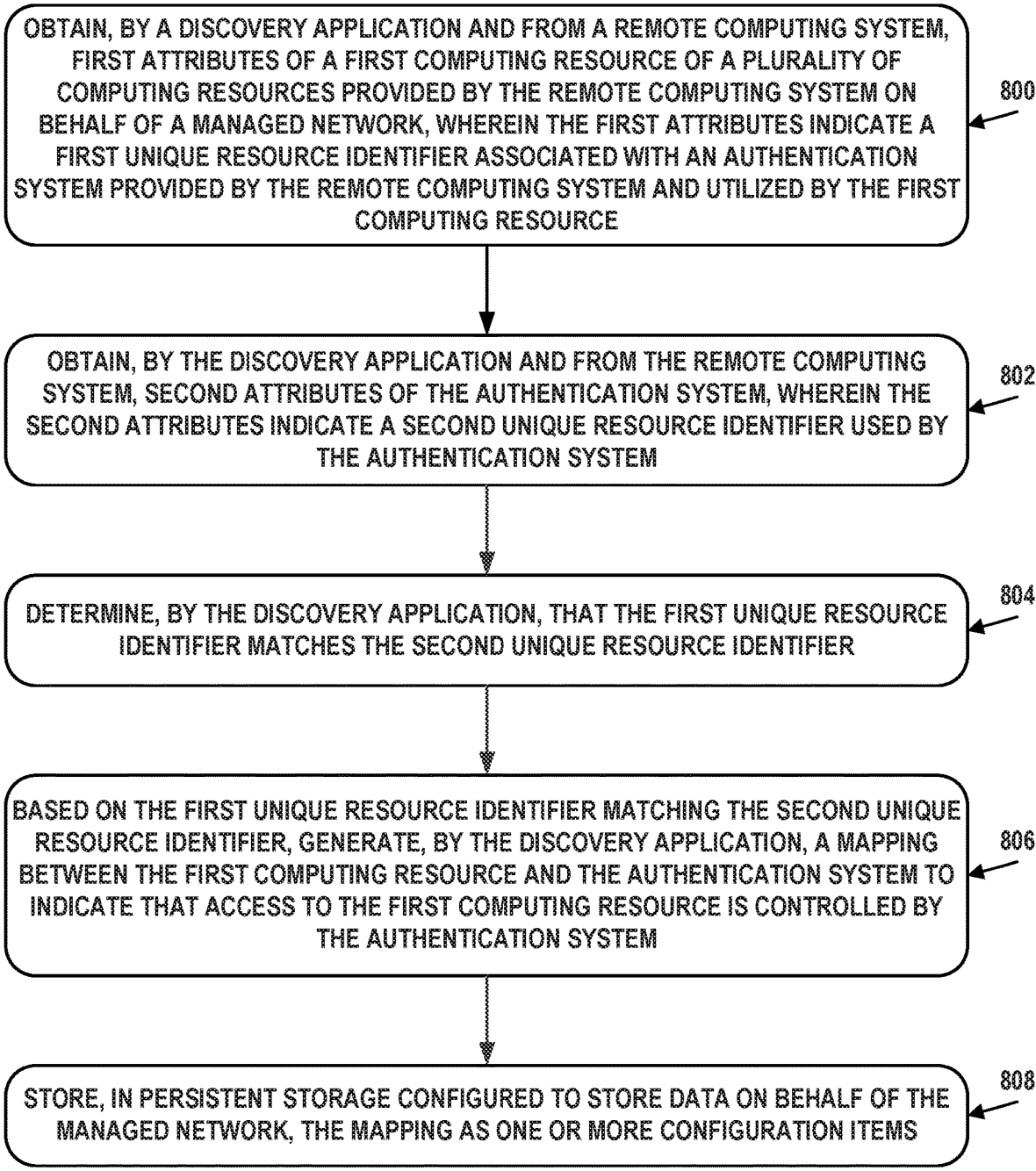
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining, by a discovery application and from a remote computing system, first attributes of a first computing resource of a plurality of computing resources provided by the remote computing system on behalf of a managed network. The first attributes may indicate a first unique resource identifier associated with an authentication system provided by the remote computing system and utilized by the first computing resource.

Block 802 may involve obtaining, by the discovery application and from the remote computing system, second attributes of the authentication system. The second attributes may indicate a second unique resource identifier used by the authentication system.

Block 804 may involve determining, by the discovery application, that the first unique resource identifier matches the second unique resource identifier.

Block 806 may involve, based on the first unique resource identifier matching the second unique resource identifier, generating, by the discovery application, a mapping between the first computing resource and the authentication system to indicate that access to the first computing resource is controlled by the authentication system.

Block 808 may involve storing, in persistent storage configured to store data on behalf of the managed network, the mapping as one or more configuration items.

In some embodiments, the second attributes of the authentication system may include one or more of: (i) a partition of the remote computing system in which the authentication system is disposed, (ii) a service name of the authentication system, (iii) a geographic region in which the authentication system resides, (iv) an account associated with the authentication system, or (v) an alphanumeric identifier associated with the authentication system. The discovery application may obtain the second unique resource identifier by combining two or more of the second attributes according to a predetermined format.

In some embodiments, the second attributes may identify a user pool of the authentication system. The user pool may define a plurality of service identifiers usable to access one or more computing resources of the plurality of computing resources. The first computing resource may utilize the user pool to control access to the first computing resource. The mapping may further indicate the user pool of the authentication system.

In some embodiments, the second attributes may identify an identity pool of the authentication system. The identity pool may define one or more temporary resource credentials usable to provide access to one or more other computing resources of the plurality of computing resources. The mapping may further indicate the identity pool of the authentication system.

In some embodiments, the first attributes may be obtained prior to obtaining the second attributes. Obtaining the second attributes of the authentication system may include, in response to obtaining the first attributes which indicate the first unique resource identifier, identifying an entry point corresponding to the authentication system. Based on the entry point, a request for the second attributes of the authentication system may be transmitted to the remote computing system. The second attributes may be received from the remote computing system.

In some embodiments, the first attributes may be obtained prior to obtaining the second attributes. The discovery application may determine a content of the first unique resource identifier. The plurality of computing resources may include a plurality of types of computing resources. Each respective type of computing resource of the plurality of types of computing resources may be associated with a corresponding unique resource identifier content. Based on the content, the discovery application may select a discovery pattern from a plurality of discovery patterns available for discovering the plurality of types of computing resources. The selected discovery pattern may be executed to cause the discovery application to obtain the second attributes of the authentication system.

In some embodiments, the first attributes may be obtained prior to obtaining the second attributes. The first attributes may be stored in the persistent storage as one or more additional configuration items. Determining that the first unique resource identifier matches the second unique resource identifier may include, in response to obtaining the second attributes, parsing the one or more additional configuration items to identify therein one or more unique resource identifiers. The first unique resource identifier may be identified within the one or more unique resource identifiers.

In some embodiments, the second attributes may be obtained prior to obtaining the first attributes. The first attributes may be stored in the persistent storage as one or more additional configuration items. Determining that the first unique resource identifier matches the second unique resource identifier may include, in response to storing the first attributes in the persistent storage, parsing the one or more additional configuration items to identify therein one or more unique resource identifiers. The first unique resource identifier may be identified within the one or more unique resource identifiers.

In some embodiments, the first attributes may additionally indicate a third unique resource identifier associated with an additional computing resource of the plurality of computing resources. The discovery application may be configured to obtain, from the remote computing system, third attributes of the additional computing resource associated with the third unique resource identifier. The discovery application may also be configured to determine, based on the third attributes, that the additional computing resource utilizes the authentication system by way of the first computing resource. The discovery application may further be configured to update the mapping to indicate that the additional computing resource utilizes the authentication system by way of the first computing resource to control access to the additional computing resource. The mapping as updated may be stored in the persistent storage.

In some embodiments, the first computing resource may include a dynamically triggerable software function. The first attributes may include programmatic code that contains therein the first unique resource identifier.

In some embodiments, the first computing resource may include a data storage structure. The first attributes may include: (i) contents of the data storage structure that indicate the first unique resource identifier or (ii) metadata associated with the data storage structure that indicates the first unique resource identifier.

In some embodiments, the first attributes may include trigger events that cause the first computing resource to invoke execution of or provide access to another computing resource of the plurality of computing resources. At least one trigger event of the trigger events may indicate the first unique resource identifier.

In some embodiments, obtaining at least one of (i) the first attributes or (ii) the second attributes may involve generating an HTTP request that: (i) specifies, by way of one or more HTTP parameters, a function of an API provided by the remote computing system, and (ii) includes authentication credentials for interacting with the API. The HTTP request may be transmitted to the remote computing system. An HTTP response may be received from the remote computing system. The HTTP response may contain an output of the function. The output may identify the at least one of (i) the first attributes or (ii) the second attributes.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
persistent storage configured to store data on behalf of a managed network, wherein a remote computing system provides a plurality of computing resources on behalf of the managed network; and
a discovery application configured to perform operations comprising:
obtaining, from the remote computing system, first attributes of a first computing resource of the plurality of computing resources, wherein the first attributes indicate a first unique resource identifier associated with an authentication system provided by the remote computing system and utilized by the first computing resource;
obtaining, from the remote computing system, second attributes of the authentication system, wherein the second attributes indicate a second unique resource identifier used by the authentication system;
determining that the first unique resource identifier matches the second unique resource identifier;
based on the first unique resource identifier matching the second unique resource identifier, generating a mapping between the first computing resource and the authentication system to indicate that access to the first computing resource is controlled by the authentication system; and
storing, in the persistent storage, the mapping as one or more configuration items.

2. The computing system of claim 1, wherein the second attributes of the authentication system comprise one or more of: (i) a partition of the remote computing system in which the authentication system is disposed, (ii) a service name of the authentication system, (iii) a geographic region in which the authentication system resides, (iv) an account associated with the authentication system, or (v) an alphanumeric identifier associated with the authentication system, and wherein the operations comprise:
obtaining the second unique resource identifier by combining two or more of the second attributes according to a predetermined format.

3. The computing system of claim 1, wherein the second attributes identify a user pool of the authentication system, wherein the user pool defines a plurality of service identifiers usable to access one or more computing resources of the plurality of computing resources, wherein the first computing resource utilizes the user pool to control access to the first computing resource, and wherein the mapping indicates the user pool of the authentication system.

4. The computing system of claim 1, wherein the second attributes identify an identity pool of the authentication system, wherein the identity pool defines one or more temporary resource credentials usable to provide access to one or more other computing resources of the plurality of computing resources, and wherein the mapping indicates the identity pool of the authentication system.

5. The computing system of claim 1, wherein the first attributes are obtained prior to obtaining the second attributes, and wherein obtaining the second attributes of the authentication system comprises:
in response to obtaining the first attributes which indicate the first unique resource identifier, identifying an entry point corresponding to the authentication system;
transmitting, to the remote computing system and based on the entry point, a request for the second attributes of the authentication system; and
receiving, from the remote computing system, the second attributes.

6. The computing system of claim 1, wherein the first attributes are obtained prior to obtaining the second attributes, and wherein the operations comprise:
determining a content of the first unique resource identifier, wherein the plurality of computing resources comprises a plurality of types of computing resources, and wherein each respective type of computing resource of the plurality of types of computing resources is associated with a corresponding unique resource identifier content;
based on the content, selecting a discovery pattern from a plurality of discovery patterns available for discovering the plurality of types of computing resources; and
executing the selected discovery pattern to cause the discovery application to obtain the second attributes of the authentication system.

7. The computing system of claim 1, wherein the first attributes are obtained prior to obtaining the second attributes, wherein the first attributes are stored in the persistent storage as one or more additional configuration items, and wherein determining that the first unique resource identifier matches the second unique resource identifier comprises:
in response to obtaining the second attributes, parsing the one or more additional configuration items to identify therein one or more unique resource identifiers; and
identifying the first unique resource identifier within the one or more unique resource identifiers.

8. The computing system of claim 1, wherein the second attributes are obtained prior to obtaining the first attributes, wherein the first attributes are stored in the persistent storage as one or more additional configuration items, and wherein determining that the first unique resource identifier matches the second unique resource identifier comprises:
in response to storing the first attributes in the persistent storage, parsing the one or more additional configuration items to identify therein one or more unique resource identifiers; and identifying the first unique resource identifier within the one or more unique resource identifiers.

9. The computing system of claim 1, wherein the first attributes additionally indicate a third unique resource identifier associated with an additional computing resource of the plurality of computing resources, wherein the operations comprise:
obtaining, from the remote computing system, third attributes of the additional computing resource associated with the third unique resource identifier;
determining, based on the third attributes, that the additional computing resource utilizes the authentication system by way of the first computing resource;
updating the mapping to indicate that the additional computing resource utilizes the authentication system by way of the first computing resource to control access to the additional computing resource; and
storing, in the persistent storage, the mapping as updated.

10. The computing system of claim 1, wherein the first computing resource comprises a dynamically triggerable software function, and wherein the first attributes include programmatic code that contains therein the first unique resource identifier.

11. The computing system of claim 1, wherein the first computing resource comprises a data storage structure, and wherein the first attributes include: (i) contents of the data storage structure that indicate the first unique resource identifier or (ii) metadata associated with the data storage structure that indicates the first unique resource identifier.

12. The computing system of claim 1, wherein the first attributes comprise trigger events that cause the first computing resource to invoke execution of or provide access to another computing resource of the plurality of computing resources, and wherein at least one trigger event of the trigger events indicates the first unique resource identifier.

13. The computing system of claim 1, wherein obtaining at least one of (i) the first attributes or (ii) the second attributes comprises:
generating a hypertext transfer protocol (HTTP) request that: (i) specifies, by way of one or more HTTP parameters, a function of an application programming interface (API) provided by the remote computing system, and (ii) includes authentication credentials for interacting with the API;
transmitting the HTTP request to the remote computing system; and
receiving, from the remote computing system, an HTTP response that contains an output of the function, wherein the output identifies the at least one of (i) the first attributes or (ii) the second attributes.

14. A computer-implemented method comprising:
obtaining, by a discovery application and from a remote computing system, first attributes of a first computing resource of a plurality of computing resources provided by the remote computing system on behalf of a managed network, wherein the first attributes indicate a first unique resource identifier associated with an authentication system provided by the remote computing system and utilized by the first computing resource;
obtaining, by the discovery application and from the remote computing system, second attributes of the authentication system, wherein the second attributes indicate a second unique resource identifier used by the authentication system;
determining, by the discovery application, that the first unique resource identifier matches the second unique resource identifier;

based on the first unique resource identifier matching the second unique resource identifier, generating, by the discovery application, a mapping between the first computing resource and the authentication system to indicate that access to the first computing resource is controlled by the authentication system; and
storing, in persistent storage configured to store data on behalf of the managed network, the mapping as one or more configuration items.

15. The computer-implemented method of claim 14, wherein the second attributes of the authentication system comprise one or more of: (i) a partition of the remote computing system in which the authentication system is disposed, (ii) a service name of the authentication system, (iii) a geographic region in which the authentication system resides, (iv) an account associated with the authentication system, or (v) an alphanumeric identifier associated with the authentication system, and wherein the method comprises:
obtaining the second unique resource identifier by combining two or more of the second attributes according to a predetermined format.

16. The computer-implemented method of claim 14, wherein the first attributes are obtained prior to obtaining the second attributes, and wherein obtaining the second attributes of the authentication system comprises:
in response to obtaining the first attributes which indicate the first unique resource identifier, identifying an entry point corresponding to the authentication system;
transmitting, to the remote computing system and based on the entry point, a request for the second attributes of the authentication system; and
receiving, from the remote computing system, the second attributes.

17. The computer-implemented method of claim 14, wherein the first attributes are obtained prior to obtaining the second attributes, and wherein obtaining the second attributes comprises:
determining a content of the first unique resource identifier, wherein the plurality of computing resources comprises a plurality of types of computing resources, and wherein each respective type of computing resource of the plurality of types of computing resources is associated with a corresponding unique resource identifier content;
based on the content, selecting a discovery pattern from a plurality of discovery patterns available for discovering the plurality of types of computing resources; and
executing the selected discovery pattern to cause the discovery application to obtain the second attributes of the authentication system.

18. The computer-implemented method of claim 14, wherein the first attributes are obtained prior to obtaining the second attributes, wherein the first attributes are stored in the persistent storage as one or more additional configuration items, and wherein determining that the first unique resource identifier matches the second unique resource identifier comprises:
in response to obtaining the second attributes, parsing the one or more additional configuration items to identify therein one or more unique resource identifiers; and
identifying the first unique resource identifier within the one or more unique resource identifiers.

19. The computer-implemented method of claim 14, wherein the second attributes are obtained prior to obtaining the first attributes, wherein the first attributes are stored in the persistent storage as one or more additional configuration items, and wherein determining that the first unique resource identifier matches the second unique resource identifier comprises:

in response to storing the first attributes in the persistent storage, parsing the one or more additional configuration items to identify therein one or more unique resource identifiers; and identifying the first unique resource identifier within the one or more unique resource identifiers.

20. An article of manufacture including a non-transitory computer-readable medium, having stored thereon program instructions that, upon execution by a computing system, cause the computing system to perform operations comprising:

obtaining, from a remote computing system, first attributes of a first computing resource of a plurality of computing resources provided by the remote computing system on behalf of a managed network, wherein the first attributes indicate a first unique resource identifier associated with an authentication system provided by the remote computing system and utilized by the first computing resource;

obtaining, from the remote computing system, second attributes of the authentication system, wherein the second attributes indicate a second unique resource identifier used by the authentication system;

determining that the first unique resource identifier matches the second unique resource identifier;

based on the first unique resource identifier matching the second unique resource identifier, generating a mapping between the first computing resource and the authentication system to indicate that access to the first computing resource is controlled by the authentication system; and storing, in persistent storage configured to store data on behalf of the managed network, the mapping as one or more configuration items.

* * * * *